United States Patent [19]

Gupta et al.

[11] Patent Number: 4,915,972

[45] Date of Patent: Apr. 10, 1990

[54] FOOD PROCESSING IN OXYGEN-FREE ENVIRONMENT

[75] Inventors: Rajendra P. Gupta; Rashmi R. Gupta, both of Ottawa, Canada

[73] Assignee: Prosoya Corporation, Maryland Hts., Md.

[21] Appl. No.: 330,219

[22] Filed: Mar. 29, 1989

Related U.S. Application Data

[63] Continuation of Ser. No. 141,114, Jan. 5, 1988, abandoned, which is a continuation-in-part of Ser. No. 856,374, Apr. 28, 1986, abandoned.

[51] Int. Cl.$^4$ ............................................. A23L 1/20
[52] U.S. Cl. .................................. 426/598; 426/518; 426/634
[58] Field of Search ............... 426/634, 629, 598, 430, 426/431, 417, 518

[56] References Cited

U.S. PATENT DOCUMENTS

| | | | |
|---|---|---|---|
| 4,209,541 | 6/1980 | Clatfelter et al. | 426/634 |
| 4,369,198 | 1/1983 | Uchi et al. | 426/431 |
| 4,409,256 | 10/1983 | Johnson et al. | 426/634 |

Primary Examiner—George Yeung
Attorney, Agent, or Firm—Robert G. Hendry

[57] ABSTRACT

A method is disclosed for producing protein foods and edible oils from protein and oil containing seeds which comprises disintegrating the seeds in an oxygen-free environment, such that air is prevented from entering in and mixing with said environment, to prevent seed enzymes from producing off-flavors and bitter taste without heat treating seeds to inactivate the enzymes and concomitantly insolubilize the seed proteins. Artificial milk extracted from soybeans using this method has no-beany flavor, bitter taste, or chalkiness. Flaking of soybeans employing this method gives bland flakes without denaturing proteins. Such flakes are suitable for making highly functional palatable protein foods.

12 Claims, No Drawings

FOOD PROCESSING IN OXYGEN-FREE ENVIRONMENT

This is a continuation of application Ser. No. 141,114, filed Jan. 5, 1988 now abandoned, which is a Continuation in Part of application Ser. No. 855,374 filed Apr. 28, 1986 and now abandoned.

FIELD OF INVENTION

This invention concerns the processing of plant seeds for foods, food ingredients and edible oils which have no undesirable flavor or taste. More specifically, this invention relates to the method of preparing foods and beverages and extracting oils without off-flavors from soybeans and other legumes.

BACKGROUND OF THE INVENTION

To be generally acceptable, the foods, which definition here will include food ingredients and edible oils, need not only be nutritious, versatile and economical, but also be attractive in color, aroma, taste and texture. Plant protein preparations mainly from legumes and nuts, like soybeans, have unacceptable off-flavors which score heavily against their positive properties and limit their use.

Lipoxygenase enzyme has been recognized as the major cause of off-flavor in most vegetable protein sources including soybeans, peas and peanuts. Polyunsaturated fatty acids are oxidized through the catalytic action of lipoxygenase to initially produce hydroperoxides and finally yielding off-flavor causing agents like aldehydes, ketones, alcohols, furans, alpha-ketols and hydroxyacids.

Lipoxygenase is distributed through the cotyledons in legumes and many other seeds, but the enzyme is inactive because of its limited contact with oxygen and the substrate which are immobile due to the plant cell structure. Breaking of cell structure during the size reduction operation causes the oxidation to proceed. The control of off-flavors, therefore, requires inactivation of lipoxygenase enzyme.

Since lipoxygenase is heat sensitive, its inactivation is most commonly accomplished by thermal processing of the seeds. At temperatures above 60° C. the half-lives of the various lipoxygenase enzymes rapidly decrease with increasing temperature. However, heat treatment also reduces the nitrogen solubility index and protein dispersibility index. Similarly, other currently available methods for the effective elimination or reduction of off-flavors in plant proteins are not very compatible with the preparation of their highly functional forms because they require conditions that cause denaturing of proteins. In addition, the removal of off-flavors in edible oils not only makes the oil refining process complex but also causes oil degradation. A method is needed to solve these problems in a natural and simple way.

DESCRIPTION OF THE PRIOR ART

Many methods for the processing of legumes and other protein and oil bearing seeds have been proposed which alleviate the off-flavor problems in the end food products; example are Canadian Pat. Nos. 396108 issued to E.C. Winkler and H. Goller on Jan. 16, 1933; 457603 issued to R.A. Wait on Nov. 9, 1938; 675029 issued to T.W.M. Paulsen on Nov. 26, 1963; 677452 issued to R.J. Moshy on Jan. 7, 1964; 819072 issued to K. Fujita et al. on July 29, 1969; 920869 issued to J.R. Wagner on Feb. 13, 1973; 1004531 issued to A.I. Nelson et al. on Feb. 1, 1977; 1083879 issued to D.S. Hsieh et al. on Aug. 19, 1980; and 1091081 issued to T. Wakana et al. on Dec. 9, 1980.

The flavor problems in soybean proteins have been reviewed by J.E. Kinsella and S. Damodaran in a book "The Analysis and Control of Less Desirable Flavors in Foods and Beverages: edited by G. Charalambous and published by Academic Press in 1980. F.D. Gunstone and F.A. Norris in their book "Lipids in Foods: Chemistry, Biochemistry and Technology" published by Pergamon Press in 1983, have discussed the off-flavor problems in edible oils and methods of solving them. The prior art methods either try to inactivate the enzymes, such as lipoxygenase, involved in producing off-flavors, prior to seed desizing and deforming operations, or remove off-flavors as much as possible after they have developed. Both the approaches tend to degrade the end product nutritionally, functionally or otherwise. For example, low or no beany flavor soymilks prepared with prior art processes give chalk-like mouth feel due to undesolved fine particles remaining even after intense high pressure homogenization. The problem generally results from the heat treatment of soybeans to inactivate lipoxygenase enzymes prior to or during the disintegration of soybeans in aqueous media. Such heat treatment adversely affects the protein dispersibility index, which in turn adversely affects the soymilk yield.

It has been known for a long time that oxygen is esential for producing off-flavor causing volatiles. This fact has led many researchers to attempt disintegrating seeds in reduced oxygen environment. However, like Clatfelter et al. in U.S. Pat. No. 4,209,541 issued on June 24, 1980, and Uchi et al. in U.S. Pat. No. 4,369,198 issued on Jan. 18, 1983, they required heat treating the seeds sufficiently to inactivate the seed enzymes prior to or during seed disintegration for controlling the off-flavors.

The method of the present invention eliminates the off-flavor problem without adversely affecting the quality or yield of the end product.

SUMMARY OF THE INVENTION

One objective of this invention is to provide a method of processing legumes and other seeds into foods having no off-flavor or undesirable taste but without adversely affecting nutritional quality and functionality of the end food products. Another objective is to apply the invention method to producing soymilk with high yield and nutritional quality but without beany off-flavors and chalky mouth-feel. The present invention has established that off-flavors can be prevented from developing without adversely affecting the solubility of seed proteins in water by disintegrating the seeds in an oxygen-free environment without heat treating the seeds for inactivating the enzymes.

DESCRIPTION OF THE PREFERRED EMBODIMENTS

The present invention concerns processing of legumes and the like protein and oil-rich seeds with minimal denaturing to obtain end food products without undesirable flavors. The process comprises disintegrating the seeds, such as by grinding, milling, and flaking, in an oxygen-free environment without heat treating the seeds to the extent that will inactivate the seed enzymes significantly and concomitantly will insolublize the seed proteins. In particular, the present invention makes it unnecessary to use the heat treatment of seeds for the purpose of controlling off-flavor and bitter taste problems in the foods made from such seeds. The invention method depends entirely on limiting the availability of oxygen to the undesirable enzymatic reactions that produce off-flavor causing volatiles. In contrast to the prior art methods, no heat treatment of seeds prior to or during the seed disintegration is required for controlling the off-flavors when the free oxygen in the disintegrating environment is reduced to sufficiently low levels. For example, lipoxygenase enzymes in soybeans are inactivated above 60° C. and, therefore, according to the present invention soybeans should not be heat treated to raise their temperature above 60° C. for a duration that will inactive the enzymes to any significant extent prior to or during the soybean disintegration process.

Since flavor threshold may vary from below 0.1 ppm to above 100 ppm depending on the volatile causing an off-flavor and the substrate it is in, what is oxygen-free environment for one volatile and substrate combination may not be true for another such combination. However, as a rule of thumb, total oxygen presence in the substrate and the environment said substrate sits in should not exceed the flavor threshold of the off-flavor desired to be controlled.

The above rule may be somewhat relaxed since at very low free oxygen levels alternate reactions compete for the oxygen. Under such situations, one expects the enzymes to catalyze reactions different from those which produce off-flavor and bitter taste causing volatiles, and as a result enzymes get spent. The spent enzymes are incapable of catalysing the undesirable reactions to any significant extent even if oxygen is made available excessively. Thus, inactivating enzymes for the purpose of controlling off-flavors after disintegrating the seeds is not necessary in the present invention. However, inactivating enzymes in the disintegrated seed products at a convenient step in processing is recommended to improve the nutritional quality of the foods and to simultaneously get rid of any residual undesirable enzyme activity.

One of the more common use of this invention is expected in processing soybeans to extract oil and to prepare artificial milk, protein concentrates, protein isolates and the like, which are free from the characteristic soybean off-flavors and throat catching sensation.

In the following, the term aqueous medium will be used for plain water as well as for dilute aqueous solution of an acid, alkali or salt, while the term vacuum will be used for pressures low enough to effect boiling of the aqueous medium without heating the same. The vacuum so defined causes release of most oxygen dissolved in water and replacement of residual air in the evacuated environment by water vapors.

The following processes illustrate the application of the invention to soybeans processing:

1. One embodiment of the method comprises soaking soybeans in an aqueous medium, rinsing the swelled soybeans, putting swelled soybeans and an aqueous medium in a container, creating vacuum in said container, isolating said container from the device used to create vacuum, heating the resulting slurry in said container sufficiently to inactivate lipoxygenase enzyme and trypsin inhibitor, and removing undesolved solids from the cooked slurry to obtain soybean milk having good taste and mouth-feel but without off-flavors and throat catching sensation. Trypsin inhibitors are heat sensitive substances in soybeans which inhibit growth in growing animals and can cause pancreas enlargement and must be adequately inactivated in an edible product. Since soybeans are disintegrated at room temperatures, which result in high protein solubility in aqueous media, the process yields soybean milk which is remarkably close to dairy milk in mouth-feel. Heat treatment to inactivate trypsin inhibitor or lipoxygenase enzymes does not adversely affect the protein solubility after protein from disintegrated soybeans has dissolved in water.

2. Another embodiment of the method comprises soaking soybeans in an aqueous medium, rinsing the swelled soybeans, putting the swelled soybeans with an aqueous medium to which a deoxygenating agent like sodium sulfite may have been added, in a closed container with a small vent tube at the top, filling it with said aqueous medium such that no air bubble is trapped in the container and thereby establishing an oxygenless environment, cooking the resulting slurry in said container to inactive lipoxygenase enzyme and trypsin inhibitor, and straining the cooked slurry to obtain soybean milk having good taste and moth-feel and acceptable flavor.

3. Another embodiment of the method comprises processing soybeans as in Embodiment 1 excepting flushing vacuum with nitrogen gas.

4. Another embodiment of the method comprises processing soybeans as in Embodiment 3, excepting that the soaking of soybeans is also done in a container evacuated and flushed with nitrogen gas.

5. Another embodiment of the method comprises splitting and flaking dehulled soybeans, extracting oil from the soybean flakes by the solvent extraction process, flash desolventizing said flakes, heating the extracted oil sufficiently to inactivate lipoxygenase enzyme, and further processing the deoiled flakes to obtain various protein foods up to and including the stage of cooking, in vacuum or an inert environment. The resulting end products are free from undesirable flavors or taste.

6. Yet another embodiment of the invention method comprises splitting and flaking dehulled soybeans, extracting oil from the soybean flakes by the solvent extraction process, flash desolventizing said flakes, and heating the extracted oil sufficiently to inactivate lipoxygenase enzyme, in vacuum or an inert environment. The deoiled soybean flakes are exposed to air and kept under atmospheric conditions in the usual way until further processed. Because of the absence of lipids on soybean flake cells exposed to air, lipoxygenase remains inactive as in whole soybeans. Depending on the residual oil in said soybean flakes and the off-flavor level acceptable in the end products, it may or may not be necessary to process said flakes to make artificial milk, protein concentrates, protein isolates, or the like, in oxygen-free environment.

7. Yet another embodiment of the invention method comprises flaking dehulled and split soybeans between a pair of flaking rolls immersed in hexane. Hexane provides the required oxygen-free environment for bean disintegration by flaking to arrest the off-flavor and bitter taste causing activity of seed enzymes. The deoiled flakes thus obtained are free from off-flavor and bitter taste problems and have very high protein solubility in water. Even when processed with existing methods, such flakes yield palatable, highly functional artificial milk, protein isolates and concentrates, and other protein foods.

This invention is further illustrated by the following examples:

EXAMPLE 1

75 g of whole soybeans were soaked in tap water at room temperature for ten hours. The swelled soybeans were rinsed twice with water and put with 500 ml water in the so called one quart stainless steel container of a Warring Commercial Blendor. The container was appropriately modified to stand high vacuum even when in blending operation. A vacuum good enough to effect boiling of water at room temperature was created in the container using a vacuum pump capable of pumping down to 25 micrometer Hg pressure; water boils at 17 mm Hg pressure at 20° C. The water was allowed to boil for a few minutes to effect water degassing and to replace residual air in the container with water vapors. The container was then isolated from the vacuum pump so that excessive foaming may not occur when the soybeans are disintegrated. The blender was run for 30 seconds and the container was put in a boiling water bath for 20 minutes to inactivate lipoxygenase enzyme. The container was then opened to atmosphere and the soybean slurry transferred to a pressure cooker and the slurry cooked for a few minutes at 15 p.s.i. pressure to inactivate trypsin inhibitor. Finally, the soymilk was extracted by straining the slurry through a cloth and mechanically squeezing the fibrous residue. About 600 ml soymilk was obtained that had no off-flavor or bad taste.

EXAMPLE 2

150 g of whole soybeans were soaked in tap water at room temperature for ten hours. The swelled soybeans were rinsed twice with water and put in the container of Example 1. The container was filled with water to the top and closed with a custom made airtight transparent lid provided with a vent tube of small diameter. It was made sure that with a vent tube of small diameter. It was made sure that there were not water bubbles entrapped in the container. The blender was run for about one minute to disintegrate soybeans. The container was then put in a boiling water bath for 30 minutes to inactivate lipoxygenase enzyme. The container was opened and the slurry transferred to a pressure cooker and the slurry cooked for a few minutes at 15 p.s.i. pressure to inactivate trypsin inhibitor. Finally, soymilk was extracted by straining the slurry through a cloth and mechanically squeezing the fibrous residue. Soymilk was similar to that of Example 1 excepting that a very low beany flavor was detectable upon refrigeration.

EXAMPLE 3

Example 1 was repeated excepting that 500 ml of 0.1% sodium bicarbonate solution was used in place of water when placing soybeans in the container. The soymilk contained had no off-flavor or bad taste but had slightly more color than that of Example 1.

EXAMPLE 4

Example 2 was repeated excepting that about 100 milligrams of sodium sulfite was added to the contents of the container to deoxygenate water. The soymilk thus obtained was not significantly better than that of Example 2.

EXAMPLE 5

Example 1 was repeated with vacuum flushed with nitrogen gas at about atmospheric pressure. The soymilk obtained was similar to that in Example 1.

EXAMPLE 6

150 g of whole soybeans were soaked in plain water at room temperature for eight hours. The steeped soybeans were rinsed twice and put in one quart stainless steel container of a Warring Commercial Blendor. The container was filled completely with 0.06% sodium bicarbonate solution and closed with a custom made air tight transparent lid fitted with a vent tube in the center. The lid was shaped to ensure no air bubbles remain trapped in the container. The blender was run for about one minute to disintegrate soybeans. The container was opened to the atmosphere and the slurry transferred to a pressure cooker and the slurry cooked for a few minutes at 15 p.s.i. pressure to inactivate trypsin inhibitor. Soymilk was extracted by straining the slurry through a filter cloth and mechanically squeezing the fibrous residue. The soymilk obtained had no beany flavor or bitter taste or chalkiness.

EXAMPLE 7

Example 6 was repeated excepting that the soymilk was extracted from the uncooked slurry and the resulting soymilk was pressure cooked to inactivate trypsin inhibitor. The soymilk obtained had no off-flavor or bad taste.

EXAMPLE 8

150 g of deoiled and desolventized soybean flakes made by flaking dehulled and split soybeans between a pair of flaking rolls immersed in hexane, removing the flakes after 30 minutes from hexane, and drying the flakes by exposure to ambient air, were used in place of steeped soybeans in Example 6 and 7 to obtain soymilks without off-flavor or bitter taste problems.

EXAMPLE 9

75 g of deoiled and desolventized soybean flakes made as in Example 9 were ground with 600 ml of 0.06% sodium bicarbonate solution under atmospheric air. Soymilk was extracted by filtering the slurry through a cloth and squeezing the residue. Pressure cooked soymilk was quite acceptable in taste and flavor.

EXAMPLE 10

Examples 1 to 7 were repeated with whole, dehulled and split soybeans, steeped and unsteeped, of different varieties. In every case soymilk obtained was considered no-beany or very low-beany in flavor and had no bitter taste or chalkiness.

All the soymilks obtained in the above examples gave mouth-feel similar to that of dairy milk. Soymilk flavor or taste was possible to enhance or change by adding sugar, common salt, flavors, colors and the like.

The off-flavor threshold of a volatile in aqueous extracts of seeds is much lower than in other seed foods. Also, suspended solids are perceived as chalky in aqueous extracts. Soymilk preparation examples above, therefore, present some of the most critical tests of the invention possible and are not meant to be limiting.

Since many apparently widely different embodiments of this invention could be made without departing from the scope and spirit thereof, it is intended that all matter contained in the above description be interpreted as being illustrative only and not limiting.

The embodiments of the invention in which an exclusive property and privilege is claimed are defined as follows:

1. A method for producing protein foods and edible oils from protein and oil containing seeds comprising steps of:
    placing the seeds in an environment created to reduce its freeoxygen concentration below the threshold for the developing of volatiles causing off-flavors and bitter taste by the catalystic activity of lipoxygenase enzymes;
    maintaining the temperature of said environment below 60° C. to prevent denaturing of the seed proteins;
    disintegrating the seeds in said environment such that air is prevented from entering in and mixing with said environment; and
    separating protein foods and edible oils from the resultant of the previous steps;
wherein said environment comprises a medium selected from a group consisting of an aqueous solvent, organic solvent, inert gas, and vacuum.

2. The method of claim 1 wherein said disintegrating is done in said aqueous solvent to obtain a slurry of the seeds, said aqueous solvent being selected from the group consisting of plain water, deoxygenated water, dilute aqueous solution of an alkali, dilute aqueous solution of an acid, and dilute aqueous solution of a salt; and which further comprises:
    removing insoluble solids from said slurry to obtain seed milk; and
    then cooking said seed milk.

3. A method in accordance with claim 2 wherein:
    said seeds comprise soybeans; and
    said aqueous solvent comprises plain water and upto 0.2 percent by weight sodium bicarbonate.

4. A method in accordance with claim 3 wherein said removing insoluble solids is carried out in atmospheric environment.

5. The method of claim 1 wherein said disintegrating is done in said aqueous solvent to obtain a slurry of the seeds, said aqueous solvent being selected from the group consisting of plain water, deoxygenated water, dilute aqueous solution of an alkali, dilute aqueous solution of an acid, and dilute aqueous solution of a salt; and which further comprises:
    cooking said slurry; and
    then removing insoluble solids from said slurry to obtain seed milk.

6. A method in accordance with claim 5 wherein:
    said seeds comprise soybeans; and
    said aqueous solvent comprises plain water and upto 0.2 percent by weight sodium bicarbonate.

7. A method as set forth in claim 1 wherein said disintegrating comprises flaking seeds to make seed flakes in said medium; and which further comprises:
    exposing said flakes to an organic solvent for removing oil from said flakes;
    extracting oil from the organic solvent; and
    desolventizing the flakes to obtain deoiled flakes.

8. The method of claim 7 which further comprises disintegrating said deoiled flakes in said medium, such that air is prevented from entering in and mixing with said medium, to produce artificial milk, protein concentrates and isolates, and flour.

9. The method of claim 7 which further comprises disintegrating said deoiled flakes in said medium under atmospheric conditions to produce artificial milk, protein concentrates and isolates, and flour.

10. The method of claim 7 which further comprises disintegrating said deoiled flakes in said aqueous solvent, such that air is prevented from entering in and mixing with said aqueous solvent, to produce artificial milk, and protein concentrated and isolates.

11. The method of claim 7 which further comprises disintegrating said deoiled flakes in said aqueous solvent under atmospheric conditions to produce artificial milk and protein concentrates and isolates.

12. The method of claim 7 wherein said organic solvent comprises hexane.

* * * * *